(12) United States Patent
Balasubramanian et al.

(10) Patent No.: US 9,940,476 B2
(45) Date of Patent: Apr. 10, 2018

(54) SELECTIVE EXPOSURE OF DOCUMENT TAGS FOR SEARCH, ACCESS, AND FEED BASED ON USER GROUPS

(71) Applicant: International Business Machines Corporation, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 14/737,404

(22) Filed: Jun. 11, 2015

(65) Prior Publication Data

US 2016/0364388 A1    Dec. 15, 2016

(51) Int. Cl.
*G06F 17/30* (2006.01)
*G06F 21/62* (2013.01)

(52) U.S. Cl.
CPC .................. *G06F 21/6227* (2013.01)

(58) Field of Classification Search
CPC .... G06F 21/6227; G06F 17/30; G06F 17/241; G06F 17/3012; G06F 17/30554; G06F 17/30864; G06F 17/30038; G06F 17/124; G06F 17/24
See application file for complete search history.

(56) References Cited

U.S. PATENT DOCUMENTS

| | | | |
|---|---|---|---|
| 7,191,185 B2 | 3/2007 | Dweck et al. | |
| 7,254,588 B2 | 8/2007 | Sung et al. | |
| 7,318,238 B2 | 1/2008 | Elvanoglu et al. | |
| 7,600,263 B1 | 10/2009 | Nguyen et al. | |
| 7,636,779 B2 | 12/2009 | Hayashi et al. | |
| 7,933,889 B2 | 4/2011 | Smetters et al. | |
| 8,046,411 B2 | 10/2011 | Hayashi et al. | |
| 8,463,815 B1 | 6/2013 | Zoellner | |
| 2003/0084404 A1* | 5/2003 | Dweck .............. | G06F 17/30722 707/E17.095 |
| 2004/0006740 A1* | 1/2004 | Krohn ............... | G06F 17/30864 707/E17.108 |

(Continued)

FOREIGN PATENT DOCUMENTS

WO     2011144022 A2    11/2011

OTHER PUBLICATIONS

Amthor, "Tag Groups," WordPress Plugins, Last Updated on Mar. 15, 2015, p. 1-2, https://wordpress.org/plugins/tag-groups/, Accessed on Apr. 14, 2015.

(Continued)

*Primary Examiner* — Anh Ly
(74) *Attorney, Agent, or Firm* — Michael O'Keefe

(57) ABSTRACT

A method for selective exposure of document tags associated with a plurality of online search engine content based on a predetermined user criteria is provided. The method may include annotating a content tag associated with the plurality of search engine content with a plurality of metadata, whereby the plurality of metadata includes a text and an access control. The method may also include displaying a plurality of content based on the annotated content tag.

15 Claims, 8 Drawing Sheets

(56) References Cited

U.S. PATENT DOCUMENTS

| | | | |
|---|---|---|---|
| 2005/0198196 A1* | 9/2005 | Bohn | H04L 67/34 709/217 |
| 2007/0294614 A1* | 12/2007 | Jacquin | G06F 17/2247 707/E17.093 |
| 2008/0222108 A1* | 9/2008 | Prahlad | G06F 17/30616 707/E17.084 |
| 2009/0077062 A1* | 3/2009 | Spivack | G06Q 30/02 707/E17.107 |
| 2009/0106271 A1* | 4/2009 | Chieu | G06F 17/30929 707/E17.008 |
| 2010/0010968 A1* | 1/2010 | Redlich | G06F 17/30672 707/E17.014 |
| 2010/0030859 A1* | 2/2010 | Huang | G06F 17/30905 715/231 |
| 2010/0299313 A1* | 11/2010 | Orsini | H04L 9/085 707/652 |
| 2011/0010612 A1* | 1/2011 | Thorpe | G06F 17/30899 715/234 |
| 2011/0246817 A1* | 10/2011 | Orsini | G06F 11/1076 714/6.1 |
| 2012/0030187 A1* | 2/2012 | Marano | G06F 21/6218 707/709 |
| 2012/0124125 A1* | 5/2012 | Smith | G06F 17/30867 709/203 |
| 2012/0284637 A1* | 11/2012 | Boyer | G06Q 10/109 715/751 |
| 2012/0304247 A1 | 11/2012 | Badger et al. | |
| 2013/0054613 A1* | 2/2013 | Bishop | G06F 17/30011 707/748 |
| 2013/0132854 A1* | 5/2013 | Raleigh | G06F 3/0482 715/738 |
| 2013/0185657 A1* | 7/2013 | Gunawardena | G06F 17/30038 715/753 |
| 2014/0040275 A1* | 2/2014 | Dang | G06F 17/2785 707/741 |
| 2014/0244736 A1 | 8/2014 | Oikonomidis | |
| 2015/0294377 A1* | 10/2015 | Chow | G06Q 30/0263 705/347 |

OTHER PUBLICATIONS

Catanese et al., "Crawling Facebook for Social Network Analysis Purposes," WIMS'11, May 25-27, 2011, 8 Pages, ACM, Sogndal, Norway.

Damiani et al., "A Fine-Grained Access Control System for XML Documents," ACM Transactions on Information and System Security, May 2002, p. 169-202, vol. 5, No. 2.

Fan et al., "Secure XML Querying with Security Views," SIGMOD 2004, Jun. 13-18, 2004, 12 Pages, ACM, Paris, France.

Halder et al., "Observation-Based Fine Grained Access Control for XML Documents," Computer Information Systems—Analysis and Technologies, 2011, p. 267-276, CCIS vol. 245, Springer-Verlag.

Hinrichs et al., "TBA: A Hybrid of Logic and Extensional Access Control Systems," Formal Aspects of Security and Trust, 2012, p. 198-213, LNCS vol. 7140, Springer-Verlag.

Klemperer et al., "Tag, You Can See It! Using Tags for Access Control in Photo Sharing," CHI'12, May 5-10, 2012, 10 Pages, ACM, Austin, Texas, USA.

Mazurek et al., "Toward Strong, Usable Access Control for Shared Distributed Data," 12th USENIX Conference on File and Storage Technologies, Feb. 17-20, 2014, p. 89-103, USENIX Association, Santa Clara, CA, USA.

Mell et al., "The NIST Definition of Cloud Computing," National Institute of Standards and Technology, Sep. 2011, p. 1-3, Special Publication 800-145.

New Zealand Digital Library, "Section tagging for HTML documents," Greenstone tutorial exercise, Copyright 2005-2012, p. 1-2, http://wiki.greenstone.org/gsdoc/tutorial/gs2-current/en/section_tagging.htm, Accessed on Apr. 14, 2015.

* cited by examiner

SELECTIVE EXPOSURE OF DOCUMENT TAGS FOR SEARCH, ACCESS, AND FEED BASED ON USER GROUPS

BACKGROUND

The present invention relates generally to the field of computers, and more particularly to online searching.

There are many scenarios where one may want to selectively "expose" internet pages or documents. Typically, this is done by a user logging into a secured server or keeping the servers behind a firewall, etc. If the server is within the firewall, one may want to enable only a certain set of documents to be exposed to specific user groups because of confidentiality, or premium membership, etc. For example, an e-commerce site could provide better discounted products to its premium members, such as airlines allowing "Frequent Flier Club" members to see certain pages only.

SUMMARY

According to one embodiment, a method for selective exposure of document tags associated with a plurality of online search engine content based on a predetermined user criteria is provided. The method may include annotating a content tag associated with the plurality of search engine content with a plurality of metadata, whereby the plurality of metadata includes a text and an access control. The method may also include displaying a plurality of content based on the annotated content tag.

According to another embodiment, a computer system for selective exposure of document tags associated with a plurality of online search engine content based on a predetermined user criteria is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include annotating a content tag associated with the plurality of search engine content with a plurality of metadata, whereby the plurality of metadata includes a text and an access control. The method may also include displaying a plurality of content based on the annotated content tag.

According to yet another embodiment, a computer program product for selective exposure of document tags associated with a plurality of online search engine content based on a predetermined user criteria is provided. The computer program product may include one or more computer-readable storage devices and program instructions stored on at least one of the one or more tangible storage devices, the program instructions executable by a processor. The computer program product may include program instructions to annotate a content tag associated with the plurality of search engine content with a plurality of metadata, whereby the plurality of metadata includes a text and an access control. The computer program product may also include program instructions to display a plurality of content based on the annotated content tag.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
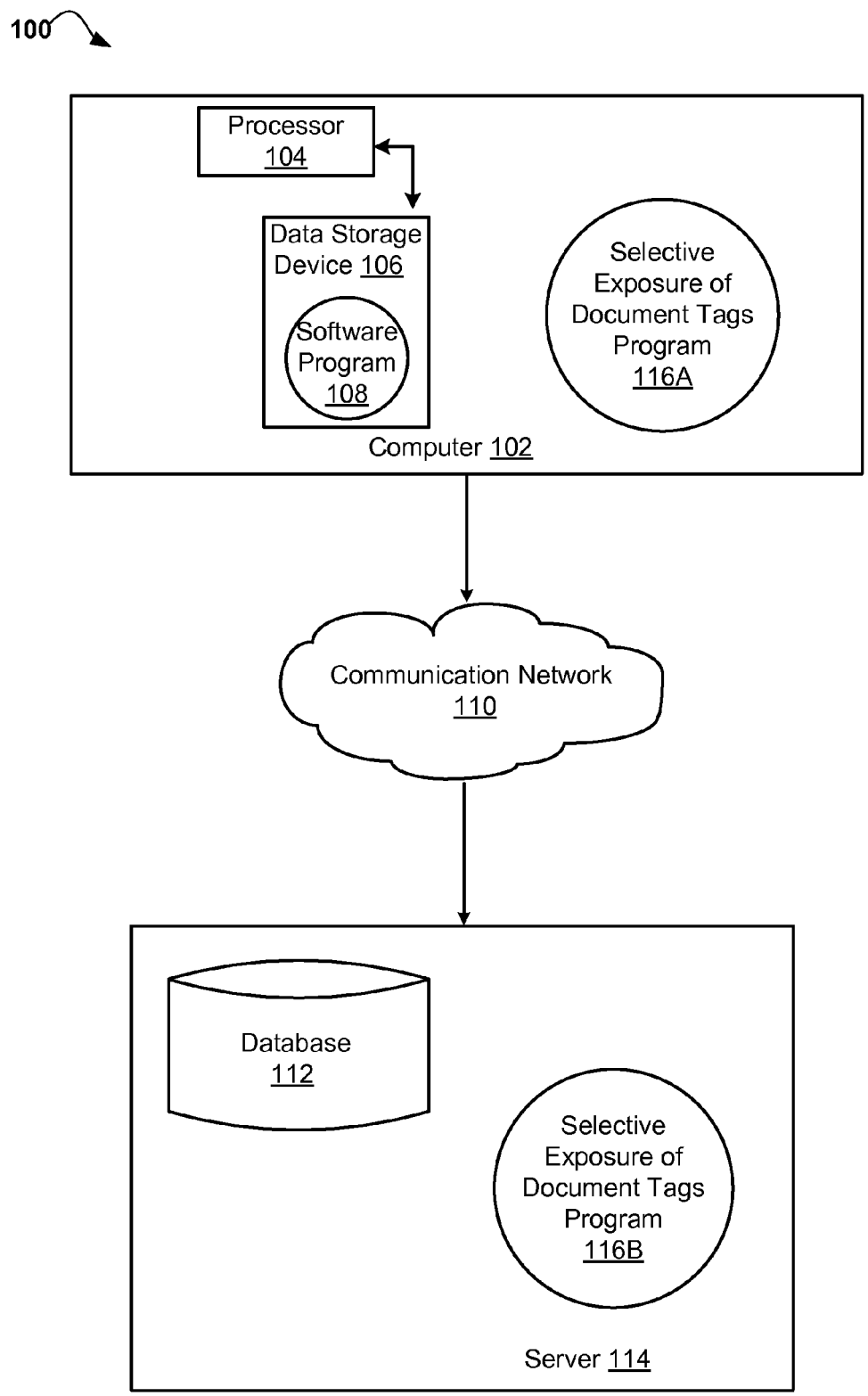
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to online searching. The following described exemplary embodiments provide a system, method and program product to, among other things, selectively expose document tags for search, access, and feed based on pre-authorized users, such as user groups. Therefore, the present embodiment has the capacity to improve the technical field of online searching by providing a search technique that facilitates selective exposure of documents by specifying additional qualifications on the search tags. More specifically, the present embodiment may enable the documents behind the firewall to offer a new application program interface (API) to perform search and access selectively which is different from authenticating a user to go behind the firewall where the user's access may be unlimited. Additionally, the present embodiment provides a selective access to certain documents based on tag authentication. As such, the present embodiment may be valuable in providing better search results and thus improving the value of search engines. For content providers, this may allow a more open and transparent way of exposing documents or pages to a select set of users without signing into its own portals.

As previously described, there are many scenarios where one may want to selectively "expose" internet pages or documents. Typically this is done by a user logging into a secured server or keeping the servers behind a firewall, etc. If the server is within the firewall, one may want to enable only a certain set of documents to be exposed to specific user groups based on a specific criteria. Additionally, there may be other ways of selectively enabling or disabling functions based on privileges. However, none of the current methods are transparent. As such, it may be advantageous, among other things, to provide a transparent search methodology using selective enabling of tags so that specific documents need not be "locked" individually. According to the present embodiment, such a transparent methodology may be implemented through a new way of tagging and providing metadata for the tags.

According to at least one implementation, the present embodiment may provide a search technique that facilitates selective exposure of documents through specifying additional qualifications on the search tags. As such, the present embodiment may provide a representational scheme of metadata for document tags that can be used to selectively expose the tags to different user groups. Then, a new search mechanism may be implemented that authenticates the tags to be exposed before subjecting to the search algorithm. Therefore, the logic associated with the present embodiment may process the metadata that examines the allowed user groups and selectively enable the tag based on permission. Furthermore, any data push mechanism may also use the present embodiment to validate the "user_group" of the receiving site before pushing the data based on tags specified. Such an approach (as described herein) is different from a keyword search or tag based search. According to the present embodiment, the tags do not change, however the tags may be qualified with certain metadata. As such, the present embodiment may enable the documents behind the firewall to offer a new API to perform a search and access of search engine content selectively since a selective access to certain documents is based on tag authentication.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for selective exposure of document tags for search, access, and feed based on user groups. According to at least one implementation, the present embodiment involves defining a new representational scheme for document tags. Additionally, the present embodiment defines new tags with appropriate access privileges using the new representational scheme and encodes new search APIs that use the new tag representational scheme as well as a new document access API that checks the access privilege based on user groups. The following is an example of the metadata representation:

```
(tag1 <allowed_groups   <group3, group5> )
(tag2 <allowed_groups   <group5, group6, group9> )
```

With respect to the above example, certain business partners can see certain product documents (e.g., Institute of Electrical and Electronics Engineer (IEEE) members who have joined "Signal Processing Interest Group" can see papers of certain topics).

The present embodiment may provide selective exposure of document tags for search, access, and feed based on users whereby a content tag is annotated with additional metadata including a text consisting of a phrase, a keyword, or a string and an access control whereby a search engine restricts or filters its searching based on the text and the access control. The content is selected from a group consisting of, but not limited to a document, a page, a file, a directory, an image, a video, etc. The access control is a group of users that is defined by a criteria selected from a group consisting of, but not limited to a membership, a credential, an age group, an authentication, etc. Additionally, an application programming interface (API) may be provided to receive the content based on an input string and the API may be utilized to receive the content and push the received content.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Selective Exposure of Document Tags Program 116A. The networked computer environment 100 may also include a server 114 that is enabled to run a Selective Exposure of Document Tags Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Selective Exposure of Document Tags Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Selective Exposure of Document Tags Program 116A, 116B may interact with a database 112 that may be embedded in various storage devices, such as, but not limited to a computer/mobile device 102, a networked server 114, or a cloud storage service.

As previously described, the client computer 102 may access the Selective Exposure of Document Tags Program 116B, running on server computer 114 via the communications network 110. For example, a user using a client computer 102 may utilize the Selective Exposure of Document Tags Program 116A, 116B to selectively expose document tags for search, access, and feed based on predefined user groups by using a user group repository 112 and authentication schemes. The Selective Exposure of Document Tags method is explained in more detail below with respect to FIGS. 2A-2D.

Referring now to FIGS. 2A-2D, operational flowcharts 200 illustrating the steps carried out by a program for selective exposure of document tags for search, access, and feed based on user groups in accordance with one embodiment is depicted. As previously described, the Selective Exposure of Document Tags Program 116A, 116B (FIG. 1) may utilize a user group repository, such as database 112 (FIG. 1) and authentication schemes and as such may be a representational scheme of metadata for document tags that can be used to selectively expose the tags to different user groups. Additionally, a new search mechanism may be implemented that authenticates the tags to be exposed before subjecting to the search algorithm. According to at least one implementation, the logic associated with the present embodiment may process the metadata that examines the allowed user groups and selectively enable the tag based on permission.

Figure 2A:
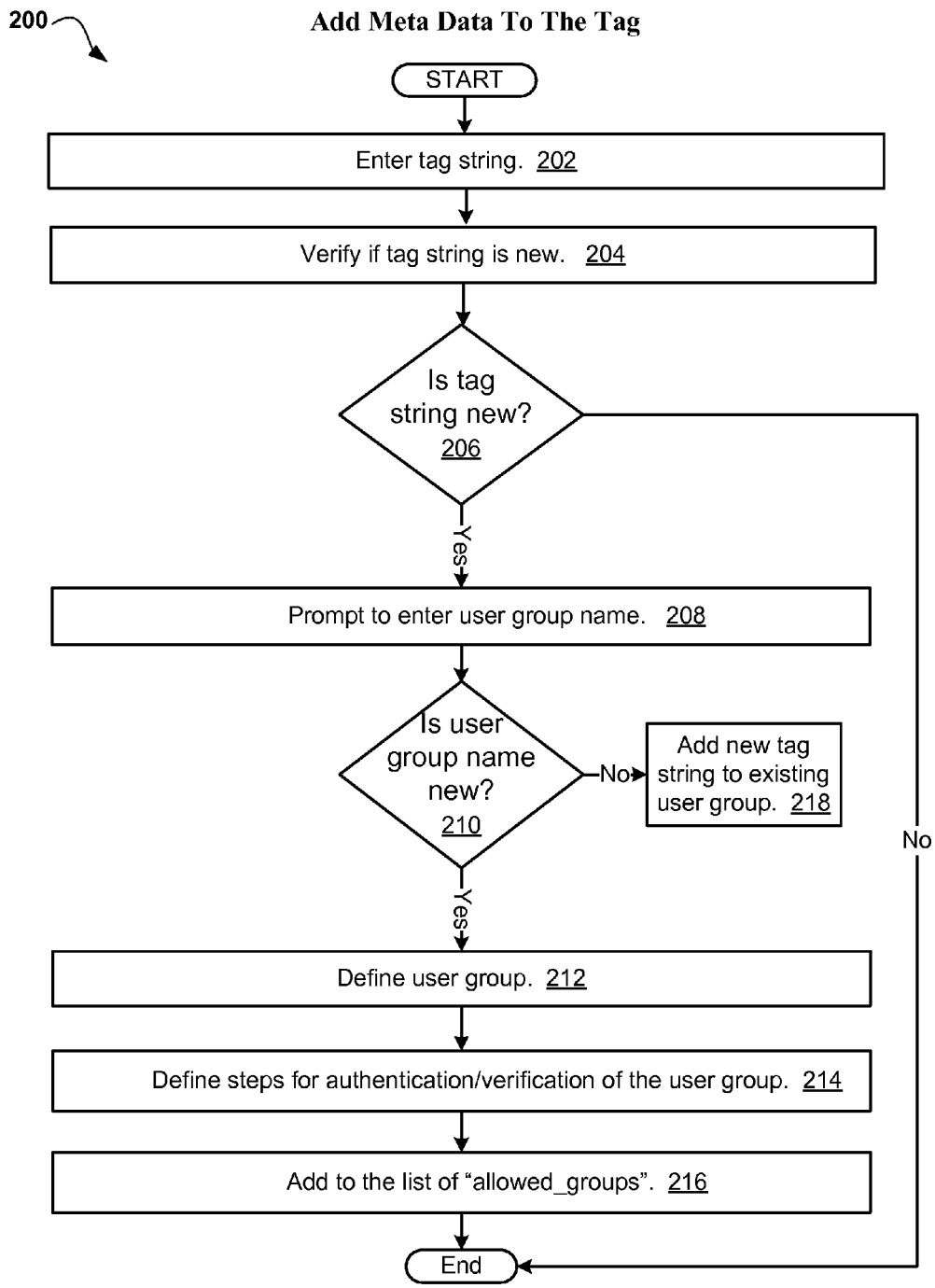
FIGS. 2A-2D are operational flowcharts illustrating the steps carried out by a program for selective exposure of document tags for search, access, and feed based on user groups.

Referring now to FIG. 2A, an operation flowchart 200 illustrating the steps to add metadata to the tag in accordance with one embodiment is depicted. According to at least one implementation, this step may be performed by the content creator. Therefore, at 202, the content creator enters a text, such as a tag string, (i.e., a phrase, a keyword or a string).

Then at 204, the Selective Exposure of Document Tags Program 116A, 116B (FIG. 1) verifies whether the entered tag string is new or not. According to at least one implementation, a repository, such as database 112 (FIG. 1) may be checked to determine if the entered tag string is new or not. If at 206 the Selective Exposure of Document Tags Program 116A, 116B (FIG. 1) determines that the tag string is not new, then the method may end. However, if at 206 the Selective Exposure of Document Tags Program 116A, 116B (FIG. 1) determines that the tag string is new then at 208, the content creator is prompted to enter a user group name.

Next at 210, it is determined whether the entered user group name is new or not. According to at least one implementation, a repository, such as database 112 (FIG. 1) may be checked to determine if the entered group name is new or not. If at 210 it is determined that the user group name is not new, then at 218, the Selective Exposure of Document Tags Program 116A, 116B (FIG. 1) adds the new tag string to the existing group.

However, if at 210 it is determined that the user group name is new, then at 212, the user group is defined and may be added to a repository, such as database 112 (FIG. 1). Next at 214, the steps for authentication or verification of the user group are defined and may be added to a repository, such as database 112 (FIG. 1). For example, user criteria may be entered to define an access control. The access control is a group of users that is defined by a criteria selected from a group consisting of, but not limited to a membership, a credential, an age group, an authentication, etc. Then at 216, the new user group name is added to the list of "allowed-_groups" along with the metadata (including a text consisting of a phrase, a keyword, or a string and an access control whereby a search engine restricts its searching based on the text and the access control).

Figure 2B:
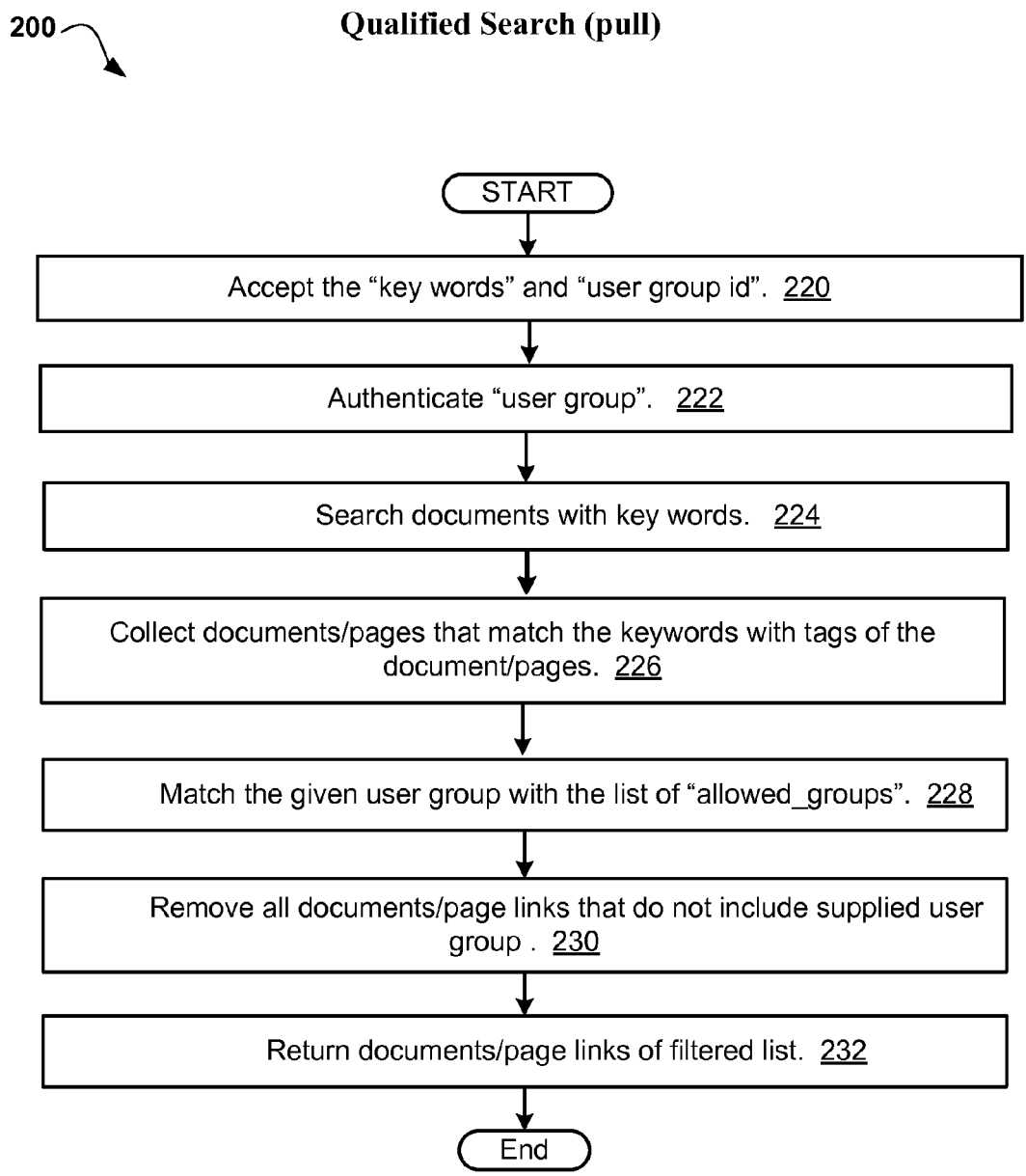

Referring now to FIG. 2B, an operation flowchart 200 illustrating the steps for a qualified search (pull) in accordance with one embodiment is depicted. According to at least one implementation, this may be performed by the search engine and triggered by an end user. Therefore, at 220, the "key words" and "user group id" are accepted. Then at 222, the Selective Exposure of Document Tags Program 116A, 116B (FIG. 1) authenticates the "user group". For example, Company A may enter an agreement with Search Company B to provide search results to only employees of Company A. End User C, who is an employee of Company A may login to Search company B and according to the present embodiment, Search Company B may authenticate (verify) End User C's access control.

Next at 224, the Selective Exposure of Document Tags Program 116A, 116B (FIG. 1) searches documents with key words. Then at 226, the Selective Exposure of Document Tags Program 116A, 116B (FIG. 1) collects documents or pages that match the keywords with tags of the documents or pages.

Then at 228, the Selective Exposure of Document Tags Program 116A, 116B (FIG. 1) matches the given user group with the list of "allowed_groups". Next at 230, the Selective Exposure of Document Tags Program 116A, 116B (FIG. 1) removes all documents or page links that do not include supplied user group.

Then at 232, the Selective Exposure of Document Tags Program 116A, 116B (FIG. 1) returns the documents or page links of the filtered list. As such, the end user will see only those documents or pages that match the end user's access control.

Figure 2C:
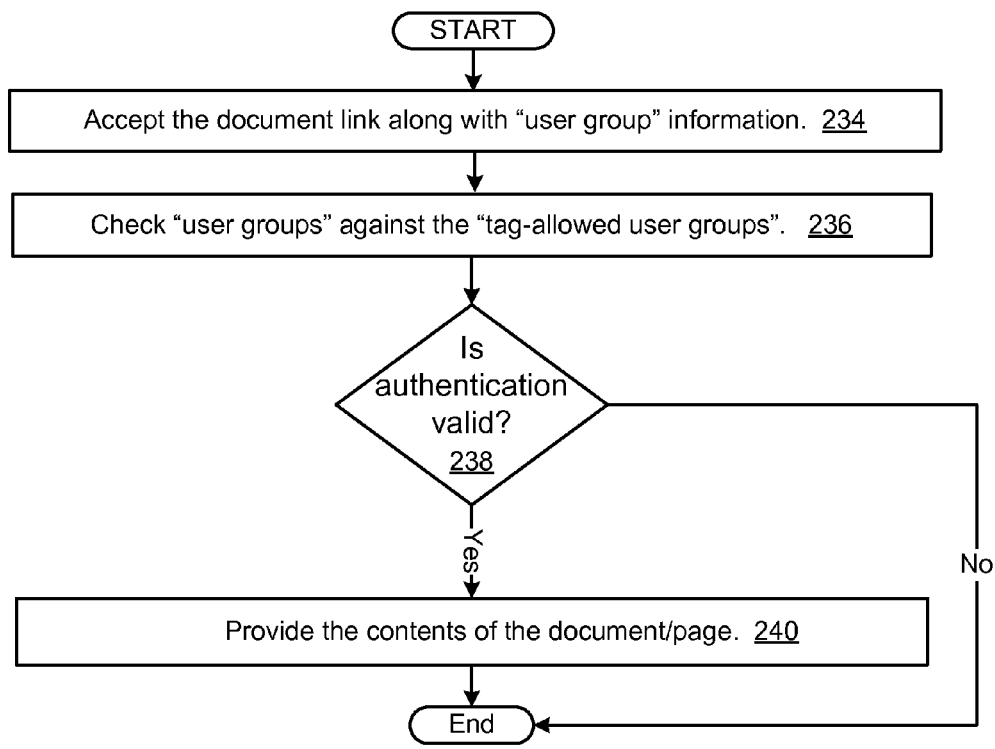

Referring now to FIG. 2C, an operation flowchart 200 illustrating the steps for qualified access (pull) in accordance with one embodiment is depicted. According to at least one implementation, this may be performed by a document administration system. Therefore, at 234, the Selective Exposure of Document Tags Program 116A, 116B (FIG. 1) accepts the document link along with "user group" information.

Then at 236, the Selective Exposure of Document Tags Program 116A, 116B (FIG. 1) checks "user groups" against the "tag-allowed user groups". Next at 238, the Selective Exposure of Document Tags Program 116A, 116B (FIG. 1) determines whether the authentication is valid. If at 238, it is determined that the authentication is not valid, then the method may end.

However, if at 238, it is determined that the authentication is valid, then the method may continue to 240 to provide the contents of the document or page.

Figure 2D:
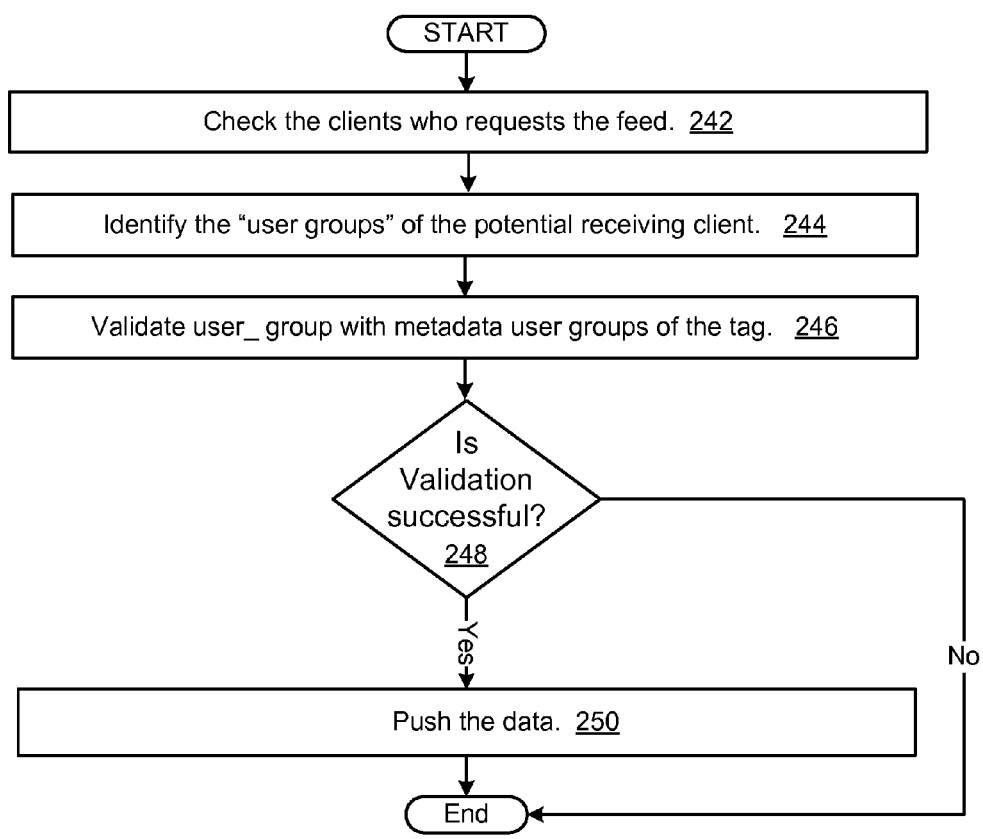

Referring now to FIG. 2D, an operation flowchart 200 illustrating the steps for qualified feed (push) in accordance with one embodiment is depicted. According to at least one implementation, this may be performed by a document administration system. Therefore, at 242, the Selective Exposure of Document Tags Program 116A, 116B (FIG. 1) checks the clients who request the feed.

Then at 244, the Selective Exposure of Document Tags Program 116A, 116B (FIG. 1) identifies the "user group" of the potential receiving client. Next at 246, the Selective Exposure of Document Tags Program 116A, 116B (FIG. 1) validates the user_group with metadata user groups of the tag.

Next at 248, the Selective Exposure of Document Tags Program 116A, 116B (FIG. 1) determines whether the validation is successful. If at 248, it is determined that the validation is not successful, then the method may end. However, if at 248, it is determined that the validation is successful, then the method may continue to 250, to push the data.

It may be appreciated that FIGS. 2A-2D provide only an illustration of one implementation and does not imply any limitations with regard to how different embodiments may be implemented. Many modifications to the depicted environments may be made based on design and implementation requirements. For example, although access groups are used as an example of the metadata that can be added to the tags, other kinds of metadata may be used as well.

The following are example use case scenarios:
Use Case 1:
ABC enters an agreement with Search Company-D to provide search results only to ABC members.
User A who is an ABC member logs into D. D verifies user A's ABC membership and maybe other group memberships.
D uses special APIs to search ABC repositories with tags equivalent to User A's keywords.
D accesses the metadata on the tags of the matched documents and once again authenticates with User A's credentials.

D returns links of documents which have tags authenticated as above.

Alternatively, ABC can verify the credentials as well.

Use Case 2:

Shopping site A has some pages (page_1 and page_2) with special discount prices or pre-release products information which are available only to its premium members.

Shopping site A has another but different discount page (page_3) for Company A employees. Shopping site A has a fourth page page_4 for Company B employees.

When a user searches from Company A's website, Company A's search engine may receive page_1, page_2 and page_3 and will show only page_3 to its employees. If for any reason, Company A has the information whether a person is premium member, it may return page_1, page_2 and page_3.

Use Case 3

Magazine Search:

Multiple Magazines tag the articles with metadata on age applicability.

Search engine verifies the user and age of the user and returns only those which are allowed for the specific age groups.

In all the above cases, it is the search engine who verifies the authenticity by matching the metadata on the tags of the documents retrieved against the access control.

The present embodiment operates in the internet domain intended for search results and applies access control to tags that annotate the document and are independent of the structure or format (e.g., the present embodiment is not associated with access protection of specified fields in an XML document). As such, the present embodiment, for example, may be used to add metadata to tags of any kind of multi-media files such as audio, video, image, etc. Therefore, the present embodiment adds the tags with additional metadata to filter from search queries for internet search engines. More specifically, the present embodiment adds metadata to the tag itself and also includes a new search scheme where tags may always be accessible to the search engine; however, the metadata on the tags may enable or disable the inclusion of the document in the output search list.

Additionally, according to various implementations of the present embodiment, additional types of access may be added by providing new metadata elements on the existing tags. The content and structure of the target file or document can be changed independent of the metadata tag and access mechanisms provided by the present embodiment. As such the present embodiment selectively may filter the search results from internet search engines based on user authentication and metadata in the document tags associated with the search content so the metadata of the tags specify who can see the search results.

Figure 3:
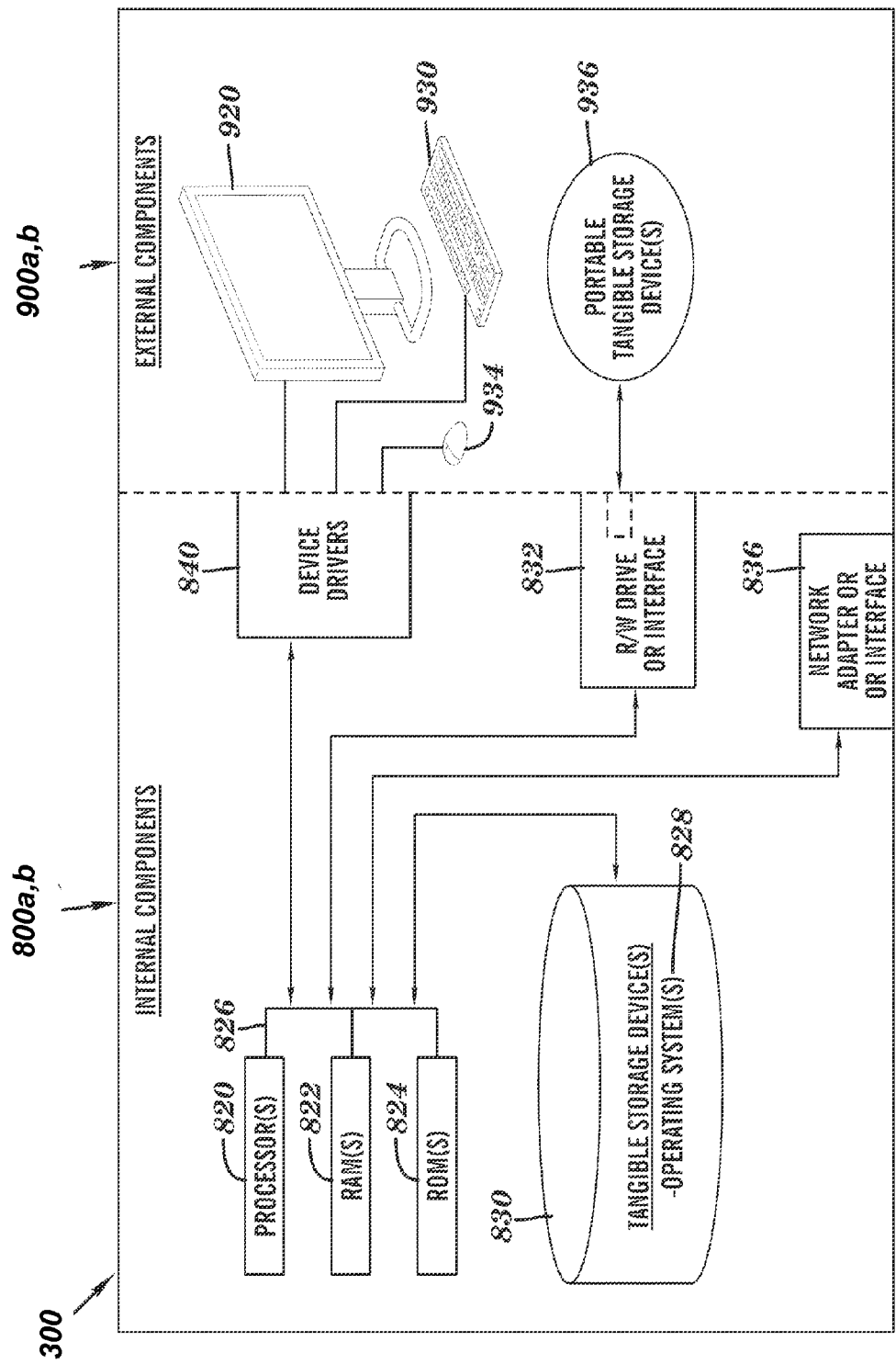
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Selective Exposure of Document Tags Program 116A (FIG. 1) in client computer 102 (FIG. 1) and the Selective Exposure of Document Tags Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Selective Exposure of Document Tags Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Selective Exposure of Document Tags Program 116A (FIG. 1) in client computer 102 (FIG. 1) and the Selective Exposure of Document Tags Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Selective Exposure of Document Tags Program 116A (FIG. 1) in client computer 102 (FIG. 1) and the Selective Exposure of Document Tags Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
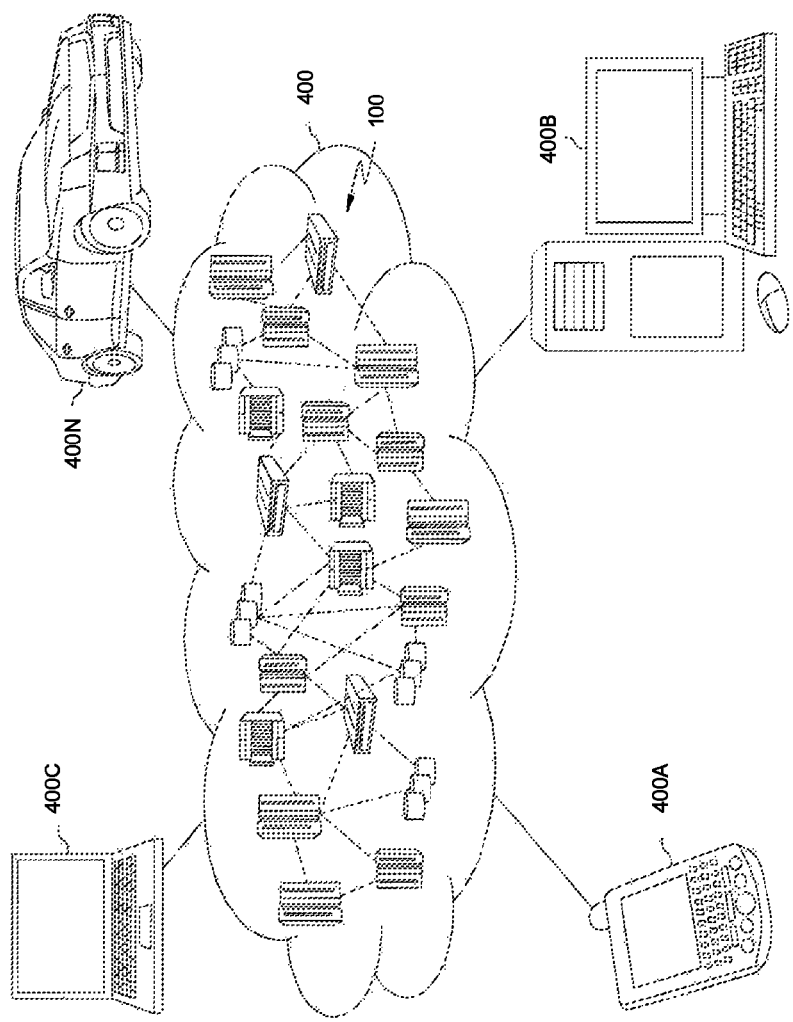
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
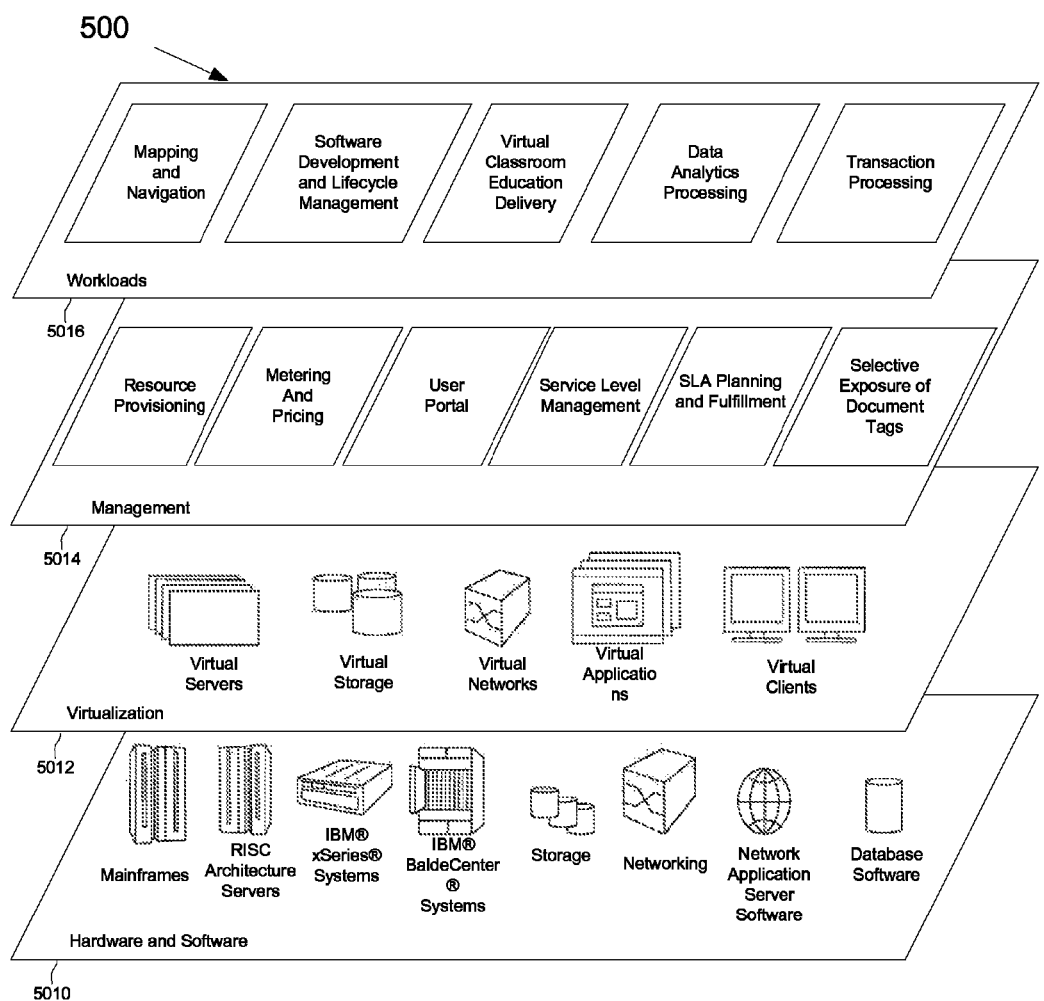
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Selective Exposure of Document Tags Program may provide selective exposure of document tags for search, access, and feed based on user groups.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selective exposure of document tags associated with a plurality of online search engine content based on a predetermined user criteria to facilitate selective exposure of documents by specifying additional qualifications on a search tag, the method comprising:
    adding, by a computing device, a content tag associated with the plurality of search engine content with a plurality of metadata, wherein the plurality of metadata includes a text and an access control, wherein the text comprises at least one of a phrase, a keyword, and a string, and wherein the access control is a group of users that is defined by a criteria comprising of at least one of a membership, a credential, an age group, and an authentication;
    accepting, by the computing device, key words and a user group id, wherein the user group id corresponds to the access control;
    searching, by the computing device, the plurality of online search engine content with key words;
    collecting, by the computing device, the searched plurality of online search engine content, wherein the key words match the content tag;
    removing, by the computing device, the collected plurality of online search engine content that is not associated with the user group id to create a filtered list; and
    returning, by the computing device, the filtered list.

2. The method of claim 1, wherein the selective exposure of document tags is associated with at least one of a search, an access, and a feed associated with an online search engine.

3. The method of claim 1, wherein the the returned filtered list is selected from a group consisting of at least one of a document, a page, a title, a directory, an image, and a video.

4. The method of claim 1, further comprising:
    receiving, by the computing device, the returned filtered list by an application programming interface (API), wherein the receiving is based on an input string; and
    pushing, by the computing device, the returned filtered list by the application programming interface (API).

5. The method of claim 1, wherein an online search engine restricts or filters a searching based on the text and the access control.

6. A computer system for selective exposure of document tags associated with a plurality of online search engine content based on a predetermined user criteria to facilitate selective exposure of documents by specifying additional qualifications on a search tag, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    adding, by a computing device, a content tag associated with the plurality of search engine content with a plurality of metadata, wherein the plurality of metadata includes a text and an access control, wherein the text comprises at least one of a phrase, a keyword, and a string, and wherein the access control is a group of users that is defined by a criteria comprising of at least one of a membership, a credential, an age group, and an authentication;
    accepting, by the computing device, key words and a user group id, wherein the user group id corresponds to the access control;
    searching, by the computing device, the plurality of online search engine content with key words;
    collecting, by the computing device, the searched plurality of online search engine content, wherein the key words match the content tag;
    removing, by the computing device, the collected plurality of online search engine content that is not associated with the user group id to create a filtered list; and
    returning, by the computing device, the filtered list.

7. The computer system of claim 6, wherein the selective exposure of document tags is associated with at least one of a search, an access, and a feed associated with an online search engine.

8. The computer system of claim 6, wherein the the returned filtered list is selected from a group consisting of at least one of a document, a page, a title, a directory, an image, and a video.

9. The computer system of claim 6, further comprising:
receiving, by the computing device, the returned filtered list by an application programming interface (API), wherein the receiving is based on an input string; and
pushing, by the computing device, the returned filtered list by the application programming interface (API).

10. The computer system of claim 9, wherein an online search engine restricts or filters a searching based on the text and the access control.

11. A computer program product for selective exposure of document tags associated with a plurality of online search engine content based on a predetermined user criteria to facilitate selective exposure of documents by specifying additional qualifications on a search tag, the computer program product comprising:
one or more computer-readable storage devices and program instructions stored on at least one of the one or more tangible storage devices, the program instructions executable by a processor, the program instructions comprising:
program instructions to add, by a computing device, a content tag associated with the plurality of search engine content with a plurality of metadata, wherein the plurality of metadata includes a text and an access control, wherein the text comprises at least one of a phrase, a keyword, and a string, and wherein the access control is a group of users that is defined by a criteria comprising of at least one of a membership, a credential, an age group, and an authentication;
program instructions to accept, by the computing device, key words and a user group id, wherein the user group id corresponds to the access control;
program instructions to search, by the computing device, the plurality of online search engine content with key words;
program instructions to collect, by the computing device, the searched plurality of online search engine content, wherein the key words match the content tag;
program instructions to remove, by the computing device, the collected plurality of online search engine content that is not associated with the user group id to create a filtered list; and
program instructions to return, by the computing device, the filtered list.

12. The computer program product of claim 11, wherein the selective exposure of document tags is associated with at least one of a search, an access, and a feed associated with an online search engine.

13. The computer program product of claim 11, wherein the the returned filtered list is selected from a group consisting of at least one of a document, a page, a title, a directory, an image, and a video.

14. The computer program product of claim 11, wherein an online search engine restricts or filters a searching based on the text and the access control.

15. The computer program product of claim 11, further comprising:
program instructions to receive, by the computing device, the returned filtered list by an application programming interface (API), wherein the receiving is based on an input string; and
program instructions to, by the computing device, the returned filtered list by the application programming interface (API).

* * * * *